(12) United States Patent
Hewitt et al.

(10) Patent No.: US 12,323,486 B2
(45) Date of Patent: *Jun. 3, 2025

(54) TECHNOLOGIES FOR CONVERSION OF ACQUIRER FILES FOR BIG DATA INGESTION

(71) Applicant: Worldpay, LLC, Symmes Township, OH (US)

(72) Inventors: James Franklin Hewitt, Cincinnati, OH (US); Senthil Andavar Karmegam, Mason, OH (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,967

(22) Filed: Jul. 26, 2022

(65) Prior Publication Data

US 2022/0360628 A1   Nov. 10, 2022

Related U.S. Application Data

(63) Continuation of application No. 14/990,055, filed on Jan. 7, 2016, now Pat. No. 11,438,412.

(51) Int. Cl.
| | |
|---|---|
| *H04L 67/1097* | (2022.01) |
| *G06F 16/25* | (2019.01) |
| *H04L 9/40* | (2022.01) |
| *H04L 67/565* | (2022.01) |

(52) U.S. Cl.
CPC ........ *H04L 67/1097* (2013.01); *G06F 16/258* (2019.01); *H04L 63/0428* (2013.01); *H04L 67/565* (2022.05); *G06Q 2220/00* (2013.01)

(58) Field of Classification Search
CPC ............. H04L 67/1097; H04L 63/0428; H04L 67/565; G06F 16/258; G06Q 2220/00
See application file for complete search history.

(56) References Cited

U.S. PATENT DOCUMENTS

| | | | | |
|---|---|---|---|---|
| 7,130,471 | B2* | 10/2006 | Bossut | G06T 9/00 |
| | | | | 382/232 |
| 7,996,411 | B2* | 8/2011 | Yaeger | G06F 40/126 |
| | | | | 707/753 |
| 2008/0033878 | A1* | 2/2008 | Krikorian | G06Q 20/14 |
| | | | | 705/44 |
| 2015/0160974 | A1 | 6/2015 | Kishore et al. | |
| 2015/0319216 | A1* | 11/2015 | Nakhjavani | G06F 16/116 |
| | | | | 709/217 |
| 2016/0253340 | A1* | 9/2016 | Barth | G06F 16/122 |
| | | | | 707/756 |
| 2017/0083716 | A1* | 3/2017 | Sun | H04L 9/14 |

* cited by examiner

*Primary Examiner* — John W Hayes
*Assistant Examiner* — Yingying Zhou
(74) *Attorney, Agent, or Firm* — Bookoff McAndrews PLLC

(57) ABSTRACT

Technologies for conversion and transmission of data files from a mainframe computing system for big data ingestion. Secure electronic payment transactional data is extracted in a mainframe format, such as Extended Binary Coded Decimal Interchange Code (EBCDIC). The electronic payment transactional data is converted to American Standard Code for Information Interchange (ASCII) code prior to transmission to a big data analytics computing system. The converted data is encrypting and transmitted for ingestion into a big data analytics computing system.

14 Claims, 3 Drawing Sheets

TECHNOLOGIES FOR CONVERSION OF ACQUIRER FILES FOR BIG DATA INGESTION

CROSS-REFERENCE TO RELATED APPLICATION(S)

This patent application is a continuation of and claims the benefit of priority to U.S. Nonprovisional patent application Ser. No. 14/990,055, filed on Jan. 7, 2016, the entirety of which is incorporated herein by reference.

BACKGROUND

Mainframe systems are large-scale computers that can be used for performing computations required for the business activities of large companies. While mainframe systems are adept at certain types of data processing, it may be desirable for various analytic processes to be performed on the data by other types of systems. As such, the data in the mainframe may need to be migrated into a secondary system for further processing. In the context of secondary systems performing big data analytics (i.e., using a Hadoop cluster), the file type required by the big data computing systems for processing may be different than the native file type of the data stored in the mainframe system. Accordingly, a conversion process must be performed prior to the big data processing. As the volume of data increases, however, the amount of computing resources of the secondary system required to perform the conversion can be resource intensive and introduce latency into the process.

SUMMARY

In an embodiment, the present disclosure is directed, in part, to a method for conversion and transmission of data files from a mainframe computing system for big data ingestion. The method comprises extracting secure electronic payment transactional data composed of Extended Binary Coded Decimal Interchange Code (EBCDIC) in a mainframe format from a database of a mainframe computing system of an acquirer computing system to create an input file. The method also comprises landing the input file in a logical partition on the mainframe system and executing a mainframe command utility to generate an output file, where the output file is in American Standard Code for Information Interchange (ASCII) code. The method also comprises encrypting the electronic payment transactional data of the output file and transmitting the encrypted output file to an ingestion component of a big data analytics computing system.

In another embodiment, the present disclosure is directed, in part, to a system for conversion and transmission of data files for big data ingestion. The system comprises an acquirer computing system comprising a mainframe computing system, the mainframe computing system comprising one or more processors executing instructions stored in memory. The instructions cause the one or more processors to extract secure electronic payment transactional data composed of Extended Binary Coded Decimal Interchange Code (EBCDIC) in a mainframe format from a database of the mainframe computing system of to create an input file and land the input file in a logical partition on the mainframe system. The instruction also cause the one or more processors to execute a mainframe command utility to generate an output file, where the output file is in American Standard Code for Information Interchange (ASCII) code. The instruction also cause the one or more processors to encrypt the electronic payment transactional data of the output file, and transmit the encrypted output file to an ingestion component of a big data analytics computing system.

In another embodiment, the present disclosure is directed, in part, to a system for conversion and transmission of data files big data ingestion. The system comprises an acquirer computing system in communication with a plurality of merchant point of sale devices. The acquirer computing system comprises a big data analytics computing system and a mainframe computing system, the mainframe computing system comprising one or more processors executing instructions stored in memory. The instructions cause the one or more processors to extract secure electronic payment transactional data composed of Extended Binary Coded Decimal Interchange Code (EBCDIC) in a mainframe format from a database of the mainframe computing system of to create an input file. The instruction also cause the one or more processors to land the input file in a logical partition on the mainframe system and execute a mainframe command utility to generate an output file, where the output file is in American Standard Code for Information Interchange (ASCII) code. The instruction also cause the one or more processors to encrypt the electronic payment transactional data of the output file and transmit the encrypted output file to an ingestion component of the big data analytics computing system.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
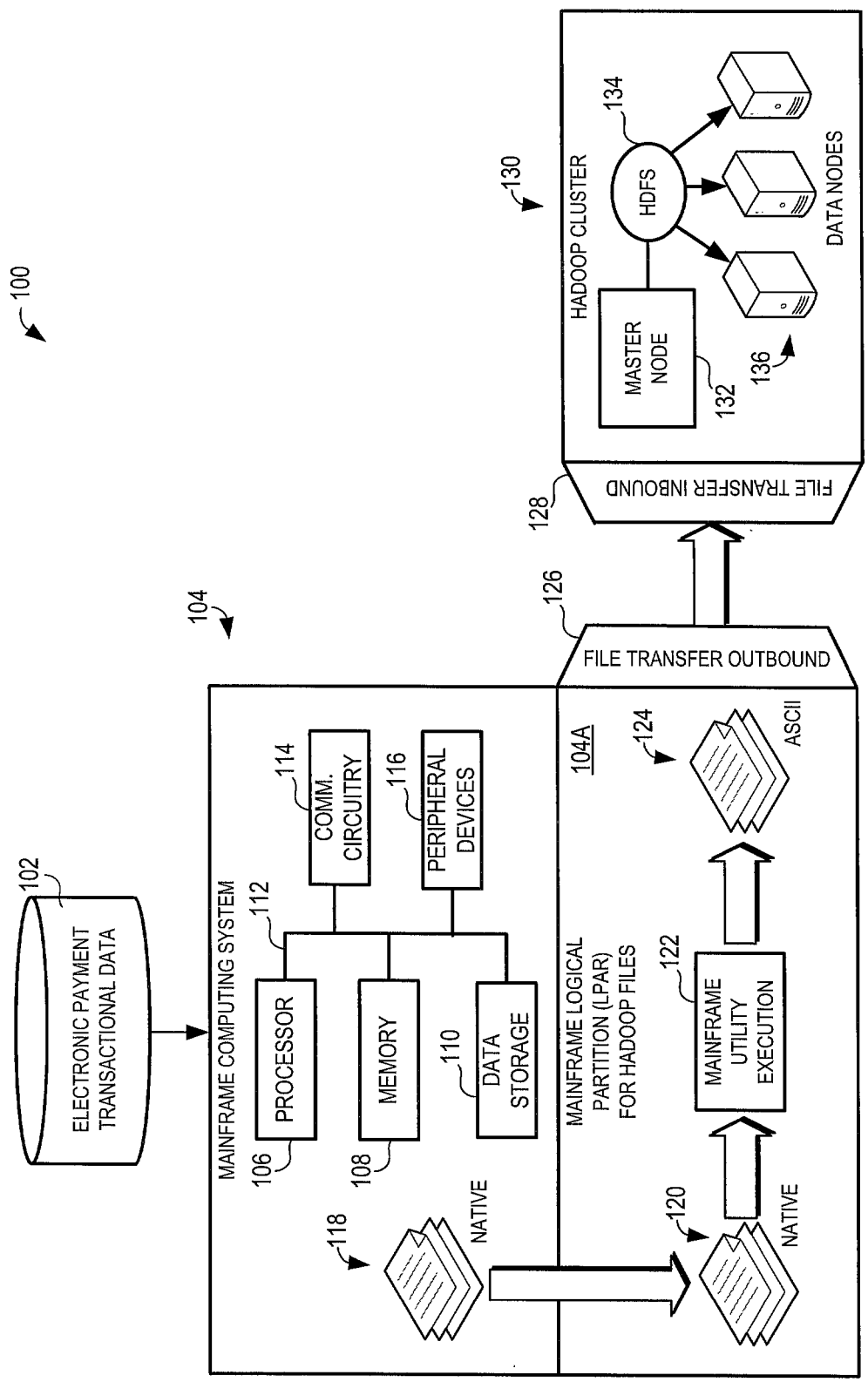
FIG. 1 is a simplified block diagram schematically illustrating the migration of electronic payment transactional data to a Hadoop cluster from a mainframe computing system according to one example non-limiting embodiment.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment can be combined with the features of other non-limiting embodiments. Such modifications and variations are intended to be included within the scope of the present disclosure.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

As is known in the art, point of sale devices of merchants typically communicate with a centralized platform, such as an acquirer processor (sometimes merchant acquirer), in order to facilitate the merchant accepting a payment card as payment for goods or services. Due to the centralized nature of such platforms and the volumes of transactions being processed, it is often necessary to host data within high-end mainframe environments to ensure that the necessary availability and capacity requirements are met. While mainframe environments are suitable for many business operations associated with payment processing, it may be desirable to migrate data held within a mainframe to a secondary system for further processing. For example, the secondary system can be a computer cluster facilitating big data analytical processing on payment transaction data collected by the centralized platform. In some implementations, the computer cluster can execute Hadoop® software, available from Apache Software Foundation, (hereinafter "Hadoop"). Hadoop is an open-source software framework for developing software for reliable, scalable, and distributed processing of large data sets across clusters of commodity machines. Hadoop can be used for applications such as log file analysis, Web indexing, report generation, machine learning research, financial analysis, among other Big Data uses. Hadoop includes a distributed file system, known as Hadoop Distributed File System (HDFS). HDFS links together the file systems on local nodes to form a unified file system that spans an entire cluster. The Hadoop Distributed File System (HDFS) offers a way to store large files across multiple machines.

Data extracted from a mainframe can be in a different file format than that utilized by a Hadoop-based system. For example, the data extracted from an originating mainframe can be Extended Binary Coded Decimal Interchange Code (EBCDIC) while a receiving Hadoop system can require data to be presented in American Standard Code for Information Interchange (ASCII) code format before Big Data analytical processes can be performed. Furthermore, because the data being ingested into the Hadoop cluster includes payment transaction data, security is paramount to ensure personally identifiable data or other sensitive information is not exposed.

In accordance with the current disclosure, prior to being transferred to the Hadoop cluster, certain files are converted from EBCDIC and ASCII by the mainframe system. A file transfer utility is then utilized to securely transfer the converted file from the mainframe system to the Hadoop cluster for ingestion. Utilizing the system and methods described herein to perform a file conversion before the data lands at the Hadoop cluster beneficially can reduce end to end processing time, central processing unit (CPU) usage, MIPS usage and latency. Thus, the herein described systems and methods ameliorate the shortcomings of existing practices and conventions by providing a scalable, reliable, efficient, and dynamic transaction payment processing platform that allows for migration of data across one or more disparate computing environments.

FIG. 1 is a simplified block diagram 100 schematically illustrating the migration of electronic payment transactional data 102 to a Hadoop cluster 130 from a mainframe computing system 104 according to one example non-limiting embodiment. Here, the mainframe computing system 104 schematically represents a large scale computer, such as one manufactured by IBM Corporation. The mainframe computing system 104 can be used for performing computations required by an acquirer processor to process and settle electronic payment transactions using a centralized computing method rather than a distributed computing method. The Hadoop cluster 130 depicted in FIG. 1 is a schematic representation of a computer cluster having an operating system, e.g., UNIX, Linux, or so on, and utilizing distributed computing processing techniques. The Hadoop cluster 130 comprises a master node 132 and an HDFS 134 for distributing processing across a plurality of data nodes 136, as is generally known in the art.

The mainframe computing system 104 can be embodied as a computing device integrated with other systems or subsystems. In the illustrative embodiment of FIG. 1, the mainframe computing system 104 includes a processor 106, a system bus 112, a memory 108, a data storage 110, communication circuitry 114, and one or more peripheral devices 116. Of course, the mainframe computing system 104 can include other or additional components, such as those commonly found in a mainframes, server, and/or computer (e.g., various input/output devices), in other embodiments. Additionally, in some embodiments, one or more of the illustrative components can be incorporated in, or otherwise from a portion of, another component. For example, the memory 108, or portions thereof, can be incorporated in the processor 106 in some embodiments. Furthermore, it should be appreciated that the mainframe computing system 104 can include other components, sub-components, and devices commonly found in a computer and/or computing device, which are not illustrated in FIG. 1 for clarity of the description.

The processor 106 can be embodied as any type of processor or combination of processors capable of performing the functions described herein. For example, the processor 106 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), a central processor (CP), a system z integrated information processor (zIIP), or other processor or processing/controlling circuit or controller.

In various configurations, the mainframe computing system 104 includes a system bus 112 for interconnecting the various components of the mainframe computing system 104. The system bus 112 can be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations with the processor 106, the memory 108, and other components of the mainframe computing system 104. In some embodiments, the mainframe computing system 104 can be integrated into one or more chips such as a programmable logic device or an application specific integrated circuit (ASIC). In such embodiments, the system bus 112 can form a portion of a system-on-a-chip (SoC) and be incorporated, along with the processor 106, the memory 108, and other components of the mainframe computing system 104, on a single integrated circuit chip.

The memory 108 can be embodied as any type of volatile or non-volatile memory or data storage capable of performing the functions described herein. For example, the memory 108 can be embodied as read only memory (ROM), random access memory (RAM), cache memory associated with the processor 106, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 108 can store various data and software used during operation of the mainframe computing system 104 such as operating systems, applications, programs, libraries, and drivers.

The data storage 110 can be embodied as any type of device or devices configured for short-term or long-term storage of data such as, for example, memory devices and circuits, memory cards, hard disk drives, solid-state drives, or other data storage devices. For example, in some embodiments, the data storage 110 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 106, or the memory 108 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 114 of the mainframe computing system 104 can be embodied as any type of communication circuit, device, interface, or collection thereof, capable of enabling communications between the mainframe computing system 104 and other computing device communicatively coupled thereto. For example, the communication circuitry 114 can be embodied as one or more network interface controllers (NICs), in some embodiments. The communication circuitry 114 can be configured to use any one or more communication technologies (e.g., wireless or wired communications) and associated protocols (e.g., Ethernet, Wi-Fi®, WiMAX, etc.) to effect such communication.

In some embodiments, the mainframe computing system 104 can communicate with each other devices over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communications between the computing devices of the system 100.

Additionally, in some embodiments, the mainframe computing system 104 can further include one or more peripheral devices 116. Such peripheral devices 116 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

In accordance with the present systems and methods, mainframe data 118 can be extracted and landed in a logical partition 104A as a mainframe data file 120. Such extraction can be based on a routine or some other triggering event. The logical partition 104A is generally a subset of the mainframe computing system's 104 hardware resources, virtualized as a separate computer. The mainframe data file 120 has a specific data type, such as Extended Binary Coded Decimal Interchange Code (EBCDIC) in a binary format. While the mainframe data file 120 could be ingested into the Hadoop cluster 130 in that format, the data could not be read for processing until converted to another format, such as American Standard Code for Information Interchange (ASCII) code. Tending to this conversion subsequent to the ingestion of the data using resources of the Hadoop cluster 130 can be undesirably resource intensive and introduce unwanted delay.

Once the mainframe data file 120 is landed into the logical partition 104A, a mainframe utility 122 can be executed. Such command can perform processes to copy, format, collate, and convert the data to the ASCII format. In some embodiments, the IBM sorting program identified as DFSORT (Data Facility Sort) is executed as the mainframe utility 122. Upon execution of the mainframe utility 122, the converted file 124 is ready for Hadoop ingestion.

For converted files 124 that are large (i.e., exceed a predetermined size threshold), compression can be used to reduce the file size prior to it moving across the network. Furthermore, as the converted file 124 is based on the electronic payment transactional data 102, sensitive data must be encrypted in motion.

A file transfer utility can then be used to transport the converted file 124 from the mainframe logical partition 104A to the Hadoop cluster 130 (as schematically shown by file transfer outbound point 126 and the file transfer inbound point 128). In some embodiments, a file transfer utility, such as a Connect:Direct provided by IBM, is utilized to accomplish encryption and compression. This ensures the file is transferred securely and efficiently from the mainframe across the network to the Hadoop cluster 130.

Figure 2:
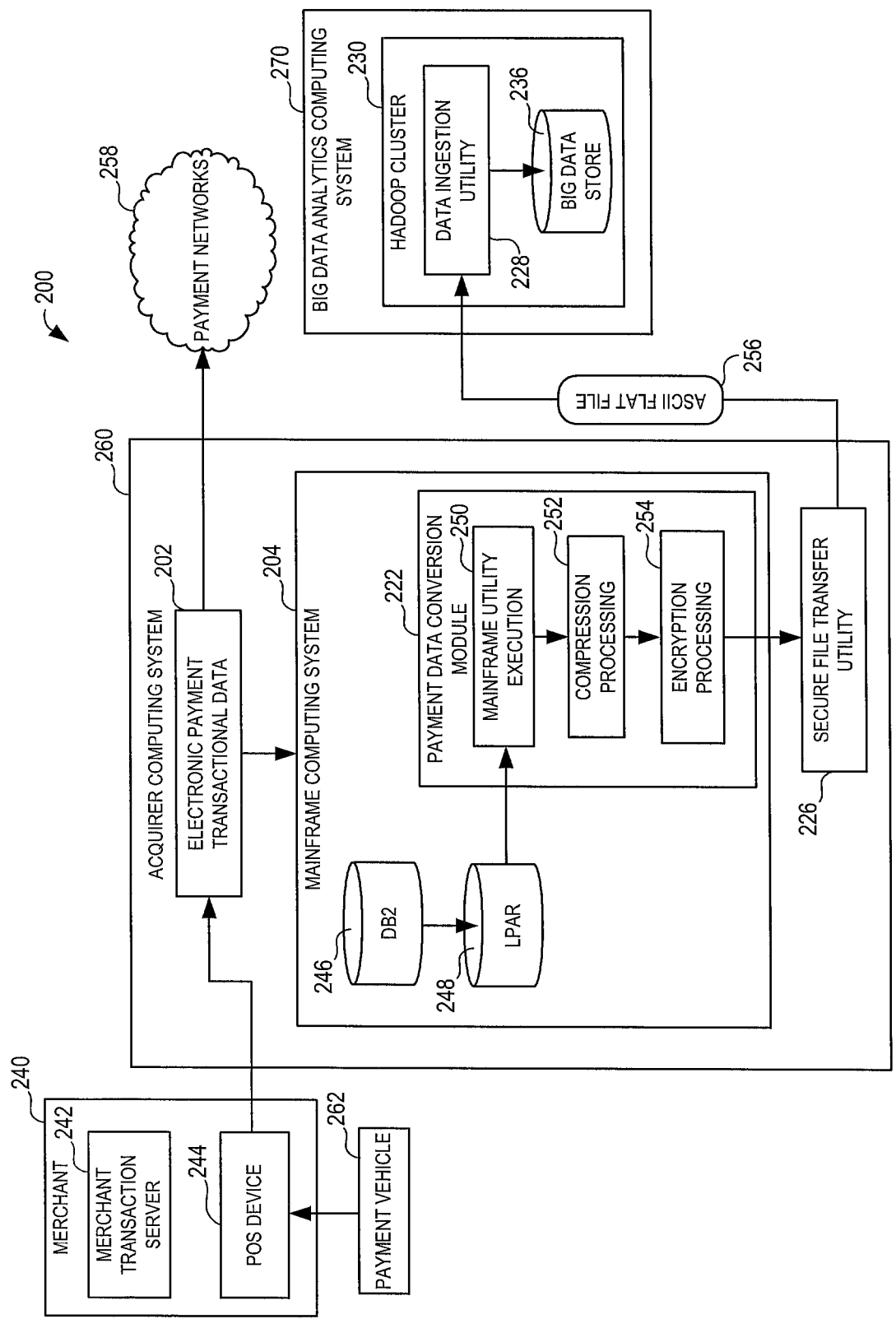
FIG. 2 is a simplified block diagram schematically illustrating the migration of electronic payment transactional data to a Hadoop cluster of a big data analytics computing system from a mainframe computing system according to one example non-limiting embodiment.

FIG. 2 is a simplified block diagram 200 schematically illustrating the migration of electronic payment transactional data 202 to a Hadoop cluster 230 of a big data analytics computing system 270 from a mainframe computing system 204 according to one example non-limiting embodiment. The mainframe computing system 204 is depicted as being a component of an acquirer computing system 260. In the system depicted in FIG. 2, a payment vehicle 262 (e.g., a credit card, a debit card, or any other type of "payment card") can be issued to or otherwise held by an account holder. The payment vehicle 262 can be used to initiate payment to a merchant 240 at a merchant point of sale (POS) device 244. The merchant POS device 244 can be any device that facilitates receipt of a payment vehicle 262 for payment of a purchase (e.g., a "purchase transaction"), such as for example, a POS terminal, a smartphone communicatively coupled with a payment dongle, or a web interface. The merchant POS device 244 can send an authorization request for the payment vehicle transaction to the acquirer computing system 260 that processes payment vehicle transactions for the merchant 240. The authorization request can include identifying information from the payment vehicle 262, such as a payment card number, a number, an expiration date, and a first and last name of the account holder, for example. The authorization request can also include identifying information from the purchase such as an amount and identifying information from the merchant POS device 244, the merchant transaction server 242, and/or the merchant 240, for example. The acquirer computing system 260 can provide the authorization request to a payment network 258. The payment network 258 can be, for example, a network of a credit card association affiliated with the payment vehicle 262. Non-limiting examples of credit card associations include VISA, MASTERCARD, DISCOVER, and AMERICAN EXPRESS. An authorization response can then be provided to the acquirer computing system 260. Upon receiving the authorization response, the acquirer computing system 260 can send either an approval message or a denial message to the merchant POS device 244 to complete the payment vehicle transaction. If the payment vehicle transaction is approved, it can be posted to the account holder's account and reconciled later with the account holder and the merchant 240.

When a transaction is initiated, the transaction can be stored as a transaction record and can comprise transaction data. Transaction records, settlement data, and/or other payment related data (schematically illustrated as electronic payment transactional data 202) can be stored in one or more locations within the system 200. The electronic payment transactional data 202 can be received from various sources, such as the merchant POS device 244, the merchant transaction server 242, the merchant 240, the acquirer processor 260, and so on. A plurality of transaction parameters associated with the payment vehicle transaction can be stored in the electronic payment transactional data 202, which can generally be used for settlement and financial recordkeeping. While the transaction parameters stored in each transaction record can vary, example transaction parameters can include, without limitation, account number, card number, payment vehicle information, product information (such as product identifier, product type, product serial number, and so forth), transaction amount, loyalty account information, merchant information, transaction amount, transaction date, transaction time, whether the transaction was a "card present" transaction, and so on. In one embodiment, the electronic payment transactional data 202 can be stored within a database 246, such as a DB2 database, of the mainframe computing system 204.

To prepare for transfer to the Hadoop cluster 230, electronic payment transactional data 202 stored within the database 246 can be landed into a logical partition 248 of the mainframe computing system 204. A payment data conversion module 222 can then process the data for ingestion into the Hadoop cluster 230. First, a mainframe utility 250 can be executed on the data to convert the data from a first data type (i.e., EBCIDIC) to a second data type (i.e., ASCII). In some embodiments, a DFSORT process is utilized. Next, compression processing 252 and/or encryption processing 254 can be performed on the converted data to further prepare the transmission. Next, a secure file transfer utility 226 is utilized to securely transfer the ASCII flat file 256 to a data ingestion utility 228 of the big data analytics computing system 270. Once ingested, the ASCII flat file 256 can be stored in the big data store 236 and available for subsequent processing.

Once ingested into the big data analytics computing system 270, the electronic payment transactional data 202, which is embodied in the ASCII flat file 256, can be processed using any of a number of big data processing approaches to extract value from the data. Beneficially, the big data analytics computing system 270 can allow for types of data processing not available through the mainframe computing system 204. By way of non-limiting examples, various analytics can be performed on the electronic payment transactional data 202 by the big data analytics computing system 270 to identify consumer behavior, determine purchasing trends, analyze fraud, among other outputs.

Figure 3:
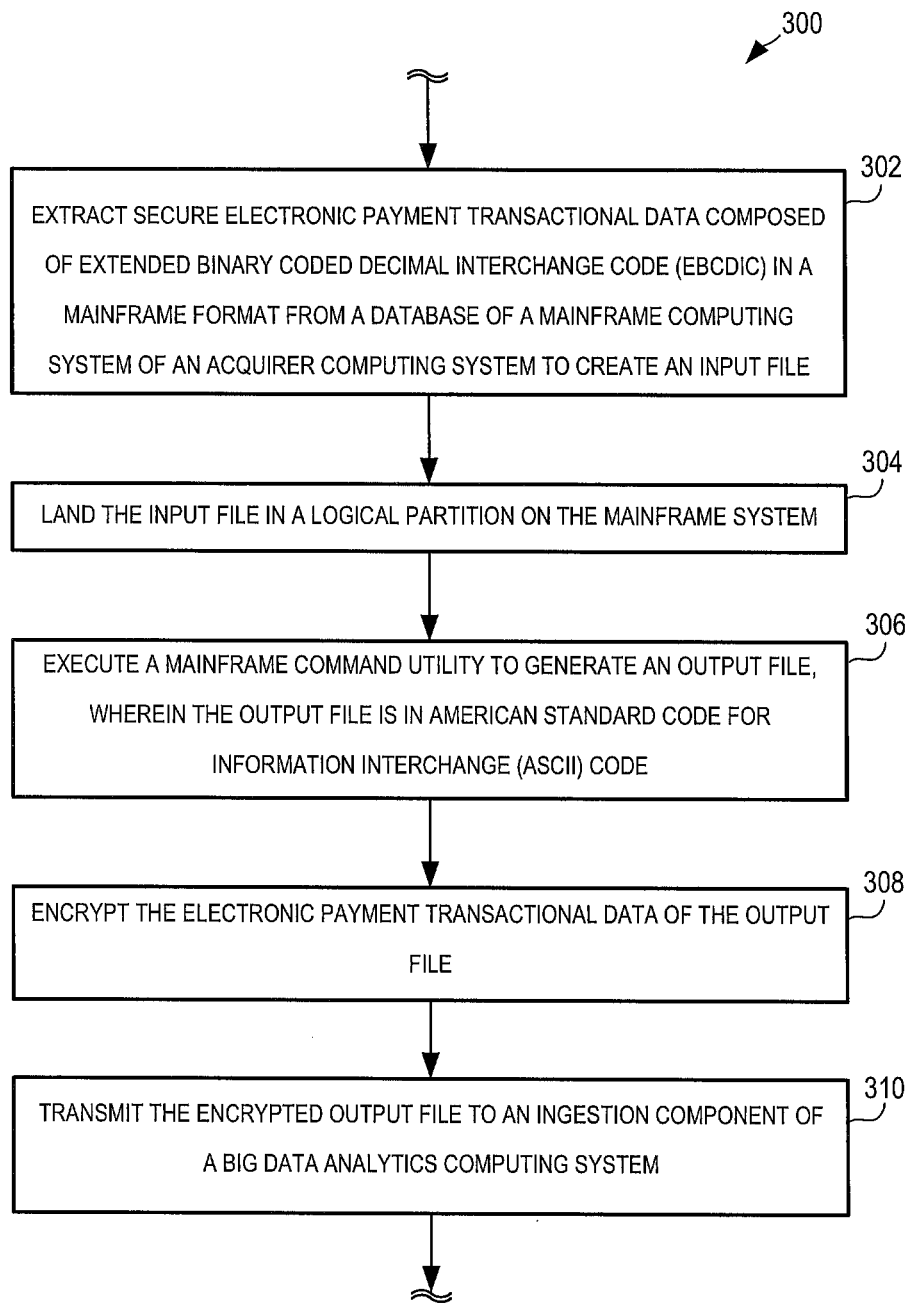
FIG. 3 is a simplified flow diagram of at least one embodiment of a method to prepare electronic payment transactional data for transfer from a mainframe computing system for ingestion into a big data analytics computing systems.

Referring now to FIG. 3, a method 300 that may be executed by a mainframe computing system (i.e., mainframe computing system 104 or 204) to prepare electronic payment transactional data for transfer from the mainframe computing system for ingestion into a big data analytics computing systems is depicted. At 302, secure electronic payment transactional data composed of Extended Binary Coded Decimal Interchange Code (EBCDIC) in a mainframe format is extracted from a database of a mainframe computing system of an acquirer computing system to create an input file, such as mainframe data 118 depicted in FIG. 1. Such extraction can occur on a reoccurring cycle. For example, in some embodiments the mainframe data file is a settlement file that is routinely created by an acquirer computing system throughout the day. At 304, the input file, such as mainframe data file 120 depicted in FIG. 1, is landed in a logical partition on the mainframe system. The landing of the input file can trigger an agent to perform one or more processes on the input file. At 306, a mainframe command utility is executed to generate an output file, such as converted file 124 depicted in FIG. 1. The output file can be in American Standard Code for Information Interchange (ASCII) code, for example. At 308, the electronic payment transactional data of the output file is encrypted and at 310 the encrypted output file is securely transmitted to an ingestion component of a big data analytics computing system.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed herein should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods can be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and can be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead can be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics can be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions can be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for migrating data files from an acquirer computing system to a computer cluster, the method comprising:
receiving, by the acquirer computing system, electronic payment transactional data, the electronic payment transactional data provided in a first data format;
storing, by the acquirer computing system, the electronic payment transactional data in a database of a first logical partition of a mainframe computing system, the mainframe computing system being a component of the acquirer computing system;
generating, by the mainframe computing system in a second logical partition of the mainframe computing system, an input file based on the electronic payment transactional data stored in the database, the input file provided in the first data format, wherein the second logical partition is a subset of a hardware resource of the mainframe computing system virtualized as a separate computer from the first logical partition;
converting, by a utility of the second logical partition of the mainframe computing system prior to transmitting an output file from the acquirer computing system to the computer cluster, the first data format of the input file to a second data format, wherein the second data format is (i) different from the first data format, (ii) unsuitable for processing by the acquirer computing system, and (iii) suitable for data processing by the computer cluster, as the output file in the acquirer computing system, wherein the acquirer computing system is a centralized type of computing system other than a distributed computer cluster type, and the computer cluster allows for types of data processing not available through the acquirer computing system;
encrypting, by the second logical partition of the mainframe computing system, the output file in the second logical partition; and based on the encrypting, transmitting, by the acquirer computing system, the output file from the second logical partition of the mainframe computing system to an ingestion component of the computer cluster.

2. The method of claim 1, further comprising:
compressing, by the acquirer computing system, the output file prior to transmitting the output file to the ingestion component of the computer cluster.

3. The method of claim 2, wherein the output file is compressed based on a determination of a size of the output file exceeding a size threshold.

4. The method of claim 1, wherein the converting comprises operations performed by DFSORT.

5. The method of claim 1, wherein the computer cluster comprises a Hadoop cluster.

6. The method of claim 1, wherein the first data format is eight-bit character encoding for mainframes, and
the second data format is seven-bit character encoding for secondary systems.

7. The method of claim 1, wherein the first data format is Extended Binary Coded Decimal Interchange Code (EBCDIC), and
the second data format is American Standard Code for Information Interchange (ASCII).

8. A system comprising an acquirer computing system, the system configured to:
receive, by the acquirer computing system, electronic payment transactional data, the electronic payment transactional data provided in a first data format;
store, by the acquirer computing system, the electronic payment transactional data in a database of a first logical partition of a mainframe computing system, the mainframe computing system being a component of the acquirer computing system;
generate, by the mainframe computing system in a second logical partition of the mainframe computing system, an input file based on the electronic payment transactional data stored in the database, the input file provided in the first data format, wherein the second logical partition is a subset of a hardware resource of the mainframe computing system virtualized as a separate computer from the first logical partition;
convert, by a utility of the second logical partition of the mainframe computing system prior to transmitting an output file from the acquirer computing system to a computer cluster, the first data format of the input file to a second data format, wherein the second data format is (i) different from the first data format, (ii) unsuitable for processing by the acquirer computing system, and (iii) suitable for data processing by the computer cluster, as the output file in the acquirer computing system, wherein the acquirer computing system is a centralized type of computing system other than a distributed computer cluster type, and the computer cluster allows for types of data processing not available through the acquirer computing system;
encrypt, by the second logical partition of the mainframe computing system, the output file in the second logical partition; and
based on the encrypting, transmit, by the acquirer computing system, the output file from the second logical partition of the mainframe computing system to a big data ingestion component of the computer cluster.

9. The system of claim 8, wherein the system is further configured to:
compress, by the acquirer computing system, the output file prior to transmitting the output file to the big data ingestion component of the computer cluster.

10. The system of claim 9, wherein the compression of the output file is based on a determination of a size of the output file exceeding a size threshold.

11. The system of claim 8, wherein the converting comprises operations performed by DFSORT.

12. The system of claim 8, wherein the input file comprises settlement data for each of a plurality of payment vehicle transactions.

13. The system of claim 8, wherein the transmitting of the output file from the acquirer computing system to the big data ingestion component of the computer cluster comprises a point-to-point data exchange.

14. The system of claim 8, wherein the system is further configured to:
transmit, by the acquirer computing system, the output file from the acquirer computing system to a Hadoop cluster.

* * * * *